United States Patent       [11] 3,580,040

[72] Inventor  Gunther Lang
               Triesterstrasse 388, Graz-Puntigam,
               Steuermark, Austria
[21] Appl. No. 771,805
[22] Filed     Oct. 30, 1968
[45] Patented  May 25, 1971
[32] Priority  Oct. 30, 1967
[33]           Austria
[31]           9764/67

[54] PROCESS AND TOOL FOR FORMING HOLES IN PROFILED MEMBERS WITH A PREDETERMINED SPACING
7 Claims, 33 Drawing Figs.
[52] U.S. Cl. ........................................... 72/324,
                                              72/379, 83/700
[51] Int. Cl. ....................................... B21d 43/28,
                                      B21c 37/02, B26d 1/00
[50] Field of Search ............................ 72/327,
                                         324, 325, 335, 379

[56]           References Cited
            UNITED STATES PATENTS
3,074,150  1/1963  Berg ............................. 72/325X
3,307,387  3/1967  Lacey et al. ................... 72/324

Primary Examiner—Richard J. Herbst
Assistant Examiner—R. M. Rogers
Attorney—Waters, Roditi, Schwartz and Nissen ABSTRACT: A process is disclosed for providing holes with particular spacing in profiled metal sheets, preferably of steel, wherein the shaping of the sheets follows the formation of the holes in the sheet. The invention contemplates cutting the perforations in the sheet while it is flat and prior to its shaping, such that the spacing between the holes in the longitudinal direction of the sheet is less than the standard spacing to be provided in the shaped member to compensate for the elongation of the sheet in the longitudinal direction during the shaping of the sheet. A tool for punching the holes includes insert members which are adjustable for regulating the reduced spacing of the holes to be punched in the sheet.

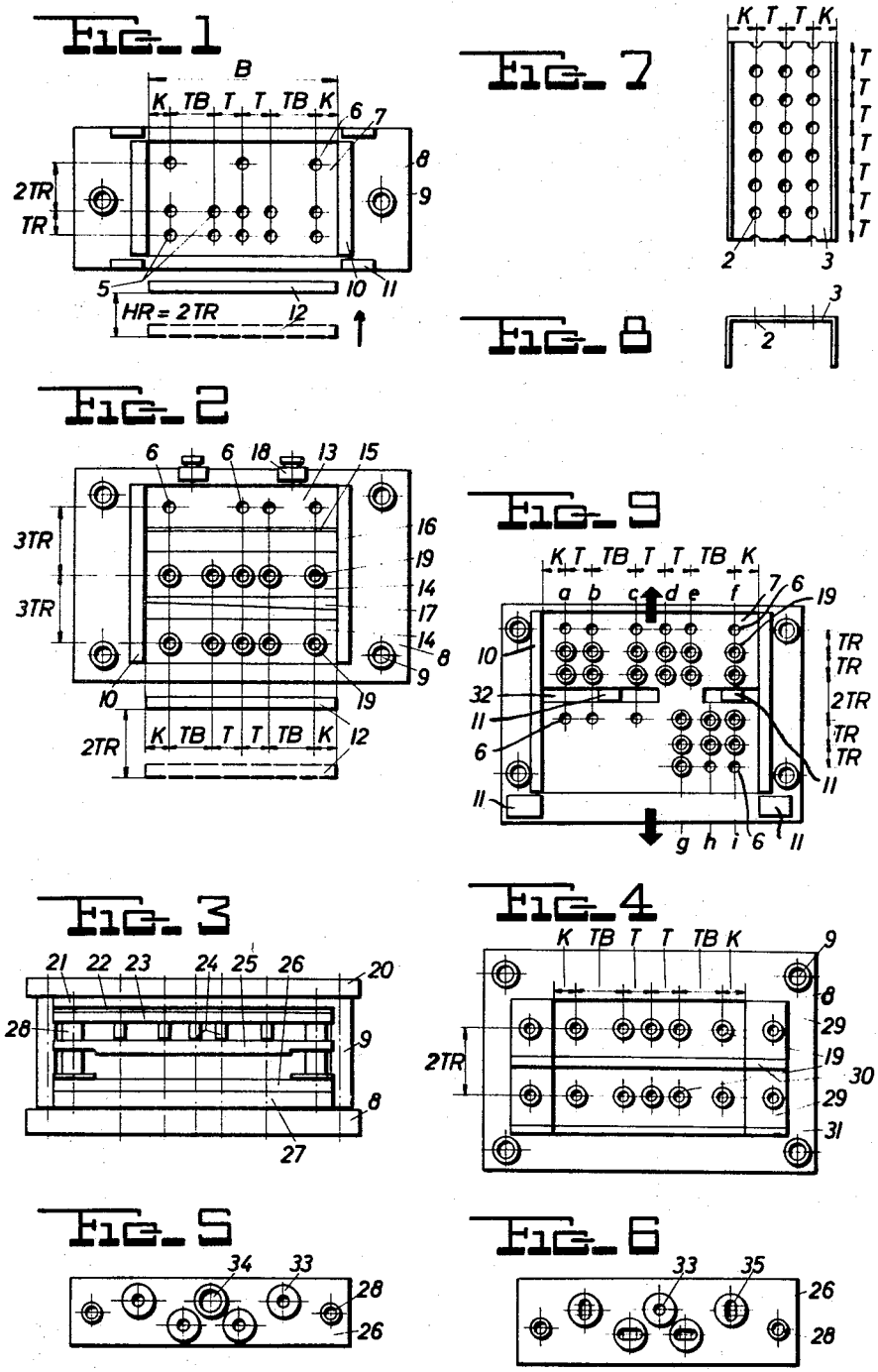

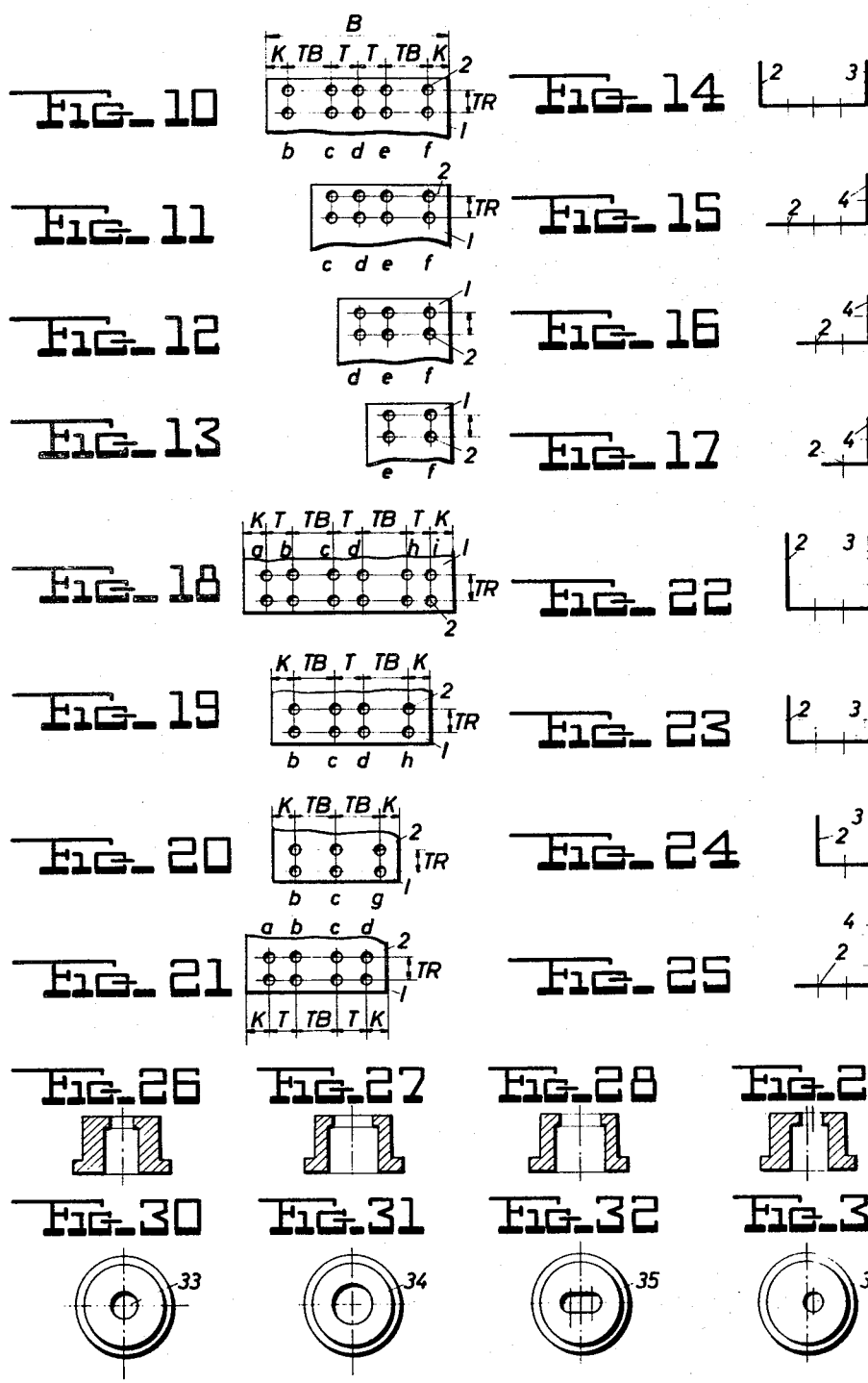

PROCESS AND TOOL FOR FORMING HOLES IN PROFILED MEMBERS WITH A PREDETERMINED SPACING

BRIEF SUMMARY OF THE INVENTION

The invention relates to a process for the fabrication of punched holes at certain intervals in shaped metal sheets, preferably of steel, wherein the shaping of the sheet is effected after the production of the holes. The invention also relates to a cutting tool for producing the holes.

Conventionally, cutting tools have been used for making such perforations, wherein the tools have hole punches, or similar elements, arranged at distances from each other corresponding exactly to the desired final hole spacing in the finished product. Thus, the configuration and arrangement of the cutting tools correspond exactly to the desired hole pattern of the profiled sheet.

In practice, it has been possible to form sheet metal sheets up to a thickness of 3 mm., in a somewhat satisfactory manner, as shaped, perforated members with the use of these tools. However, in the fabrication of perforated, profiled members of greater thickness, difficulties were encountered, because the elongations of the sheet caused by the subsequent cold shaping process, e.g. rolling engendered too considerable a change of the already fabricated holes, or of their spacing from each other, in the finished profiled member. Due to these dimensional inaccuracies with regard to the hole spacing of the finished profiled members, there resulted very considerable difficulties in assembling, for example screwing together, construction elements formed by such profiled members in framework constructions. Extreme dimensional accuracy of the hole spacing is, therefore, an important condition for the utilization of such profiled members in construction work of this nature.

An attempt has therefore been made to solve this problem by perforating the holes after the sheet had been profiled, because it was believed, that only in this manner could the required precision of the hole intervals be assured. However, the production of the holes in this manner encountered considerable difficulties, in part due to the fact that the fabrication of an already profiled member is, on the one hand, more difficult and complicated, than that of a flat sheet, while also on the other hand when working with the finished, profiled construction member, the latter is subjected to undesirable deformations, i.e. the standard shape and dimensions can easily be altered which detract from the quality of the end product.

Other attempts were made to solve the problem by reducing the feed speed of the sheet, and by reducing the profile-rolling pressure, by using an increased number of roll stands, however, these all failed to produce the desired favorable result.

It is an object of the invention, to avoid all the difficulties enumerated above and to make possible the production of profile members with perforations at absolutely accurate distances, and this without any special considerations of expense or effort.

According to the invention, the problem is solved, by fabricating the holes in the as yet flat and unprofiled sheet at intervals, which, in consideration of the elongation to be expected during profile rolling, are smaller than the distances desired in the finished, profiled member.

Thus, the invention, quite contrary to the trend of the endeavors heretofore described, proceeds along an essentially different, and original path, by contemplating the formation of the holes in the as yet flat and nonprofiled sheet, i.e. prior to its being deformed, and to take into account in the hole spacing, the ultimate elongation of the sheet produced by the profile-rolling by selecting smaller hole intervals than the final intervals to be obtained in the finished product. For this purpose, the hole intervals in the as yet flat and undeformed sheet are reduced by such an amount from the standard dimension, that the elongations unavoidably occurring in the deforming of the sheet will produce an expected increase in the hole-to-hole distance to provide the desired distance.

It goes without saying, that the choice of reductions of the hole-to-hole distance in the still undeformed sheet, must consider a variety of factors, such as material thickness of the sheet, size and shape of the holes, radius of profile chamfer, material properties, rolling speed, roll pressure etc. In each particular case, however, the correct measure of this reduction can be relatively easily ascertained by means of practical tests. For example, a steel sheet of 4 mm. for a theoretical hole spacing of 1,000 mm., which is continuously perforated by a cutting tool, requires a reduction of the hole-to-hole distance in the cutting tool amounting to between 2.5 mm. and 6 mm.

An accompanying advantage is that the construction elements produced according to the process of the invention, not only have an accurate hole spacing, but also an accurate overall length.

The process of the invention can be realized either by building the reduction of the graduation measurement into the configuration of the cutting tool itself, or by obtaining this reduction by choosing the stroke length of the sheet feed for each work step correspondingly shorter than for the standard hole distance.

As already mentioned, a variety of factors must be considered in the choice of reduction of the hole-to-hole distance, and among these, the material thickness of the sheet-metal sheet to be fabricated. According to a further characteristic of the invention, the hole-to-hole distance for fabricating the perforations will be shorter, the thicker the sheets, to be perforated and deformed.

The reduction of the spacing must in any case be considered in arranging the work feed of the sheet, even if the cutting tool is provided with several hole punches.

According to a further characteristic of the invention, the stepwise feed of the sheet to be fabricated, will in the last-named case always amount to a multiple of the reduced hole-to-hole spacing.

Finally, the invention is also concerned with the provision of a cutting tool suitable for the operation of these processes, and for this purpose, the distances between the individual hole punches, or similar elements of such a cutting tool are adjustable.

This provision permits the hole perforation of different sheet widths in both feed directions of the tool, which means that with one and the same cutting tool, sheets of different widths for different profiles, can be handled through the insertion of hole punches in accordance with the hole pattern of the desired profile. One and the same cutting tool can produce a series of hole profiles of identical arrangement in various shapes and dimensions, and yet the tool itself can be relatively small and economical in mounting space.

BRIEF DESCRIPTION OF THE DRAWING

FIG. 1 is a plan view of the bottom portion of a two-column cutting frame having a closed cutting table;

FIG. 2 shows the bottom portion of a four-column cutting frame with interchangeable and adjustable tool inserts;

FIG. 3 is an elevation view of a four-column cutting frame, in which two insert units with their own guide columns have been incorporated;

FIG. 4 is a plan view of a tool according to FIG. 3;

FIG. 5 is a plan view of the bottom portion of an insert unit;

FIG. 6 is a plan view of the bottom portion of another insert unit;

FIG. 7 is a plan view of a shaped sheet with perforations;

FIG. 8 is a plan view of the sheet;

FIG. 9 is a plan view of the bottom portion of a four-column cutting frame with a combined arrangement of cutting bushes;

FIGS. 10—FIG. 13 show perforated sheets with holes at reduced intervals;

FIGS. 14—FIG. 17 are elevation views of the sheets of FIGS. 10—13 respectively;

FIGS. 18—FIG. 21 show additional perforated sheets;

FIGS. 22—FIG. 25 are elevation views of the sheets of FIGS. 18—21 respectively;

FIGS. 26—FIG. 29 are cross-sectional views through uniform cutting bushes with work openings of different sizes; and FIGS. 30—FIG. 33 are plan views of the cutting bushes of FIGS. 26—29 respectively.

DETAILED DESCRIPTION

The invention will now be discussed with reference to the drawing and particularly with reference to FIG. 1 for a general understanding of the invention.

In FIG. 1 is shown the lower plate of a die for punching perforations in a sheet which is advanced stepwise by feed members 12, in the direction of the arrow, between the guides 10. When the sheet is halted, the upper die plate descends and the cutting tools on the plate pierce the sheet and enter bushings in the lower sheet whereby perforations are formed in the sheet in the arrangement corresponding to that of the dies and bushes in the plates.

As has been previously noted, the sheets after they are perforated are deformed to provide a shaped profile e.g. of channel or angle shape as shown in FIGS. 14 and 15. The spacing of the holes formed in the sheet in the direction of longitudinal feed is preselected to be slightly less than the spacing desired in the profiled member in order to compensate for increase of the spacing as a result of elongation of the sheet in the direction of longitudinal feed as caused by the deformation of the sheet when it is formed to the desirable shape. Thus as shown in FIG. 1, the spacing TR between adjacent rows of holes in the flat undeformed sheet is slightly less than the spacing T which will be obtained after the sheet has been deformed to its profiled shape.

The cutting tool as shown in FIG. 1 is constituted as a two-column cutting frame with a closed cutting table 7, which rests on a cutting-frame foundation plate 8 possessing the guide columns 9. The cutting table 7 is provided with an arrangement of circular holes 5 corresponding to the hole pattern to be produced in the profiled metal sheet. The holes 5 are arranged in the longitudinal columns at a uniform spacing T. K designates the distance from the edge of the sheet to the first column of holes. TB is the distance between the columns of holes on either side of the bend line along which the sheet is to be folded to produce the profiled sheet. B is the width of the sheet. The longitudinal spacing of the holes shows the reduced spacing TR and the division distance to the perforations of the gripping taps 6 amounts to 2 TR. The feed stroke HR corresponds in dimension to two times the reduced hole spacing i.e. 2 TR. The guides 10 are adjustable and cooperate with blocks 11 for guiding the sheet during its advancement in the tool.

The bottom portion of an embodiment of a four-column cutting frame according to FIG. 2 is provided with adjustable and interchangeable insert elements 14, and the column guides are again referenced as 9, and the cutting-frame baseplate as 8. Lateral guides 10 are attached to the bottom portion similar to that in FIG. 1. A hydraulic or mechanical adjusting and chucking system provides, either by itself, or in cooperation with wedge-shaped spacers 17 (operated hydraulically or mechanically), a spacing equal to 3 TR in the longitudinal direction. The spacing between the insert element 14 with its cutting bushes 19 to the insert element 13 with the recesses 6 for the gripping taps also amounts to 3 TR. A thin spacer strip 15 and a prismatic spacer 16 are interposed; the latter also can contain recesses 32 for adjustable guide blocks 11, as shown in detail in FIG. 9. The machine feed means is diagrammatically indicated at 12, and its stroke again corresponds to 2 TR. In the transverse direction the standard spacing T is provided between adjacent columns of holes.

The cutting tool in FIGS. 3 and 4 comprises two insert cutting units 29. These are mounted on the baseplate 8, and possess their own guide columns 28, which are clearly apparent in FIG. 3. The baseplate 8 includes four guide columns 9 and numeral 20 in FIG. 3 designates the top portion of the machine. The insert cutting units 29 consist of a head plate 21, a pressure plate 22, a punching plate 23, a movable guide plate 25, a cutting-bush plate 26 and a baseplate 27. The hole punches are shown at 24.

The plan view of the tool in FIG. 4 shows the two insert cutting units 29 mounted in spaced relation to provide a spacing 2 TR between the rows of tools. For exact adjustment of this distance, a spacer member 30 is interposed between the cutting units 29. The spacer member 30 also may contain recesses 32 for accommodating adjustable guide blocks 11 as shown in FIG. 9. Numeral 31 designates a stop element and 19 the cutting bushes. In the transverse direction, spacing T, edge distance K and the spacing TB are indicated in accordance with the hole pattern.

A plan view of the bottom portion of an insert cutting unit according to the invention, which possesses its own guide columns 28 is shown in FIGS. 5 and 6. The cutting-bush plates 26 show, by way of example, arrangements of cutting bushes with central small round hole 33, with large central round hole 34 and with longitudinal slot 35.

FIG. 7 is a plan view of an already profiled perforated sheet 3, bent to U-profile. FIG. 8 shows in elevation the U-profile of sheet 3. Due to the material elongation caused by the rolling of the sheet to shape, the longitudinal spacing of the holes 2 now corresponds to the desired standard spacing T between transverse rows and K designates the hole to edge distance.

The cutting table 7 of a cutting tool according to the invention, which, for example, may possess a four-column guiding system, in FIG. 9 is shown with a combined (staggered) arrangement of the cutting bushes 19, which, with the cooperation of adjustable sheet guide blocks 11, held in recesses 32, makes work feed possible from either side. The divisions TR, or 2 TR, respectively, in the individual column $a-i$ are shown in longitudinal direction of the cutting bushes 19, and likewise, in the transverse direction are shown the standard division T, the hole-to-edge distance K and the spacing of the holes TB on either side of the bend line. 6 designates the recesses for the gripping taps, and 10 the guide members. The cutting tool according to FIG. 9, produces perforated sheets 1 as shown in FIG. 10, which are provided with holes 2 at regular intervals with the reduced spacing TR in the longitudinal direction of the columns $b, c, d, e, f$, whereas the standard division T, the edge-to-edge distance K and the spacing TB in the transverse direction remain unchanged. The sheets are subsequently rolled to the U-shape 3 according to FIG. 14. The sheet width is designated as B. Similar results are shown in FIG. 11, and FIG. 15, respectively, with the columns $c, d, e$ and $f$; in FIG. 12 and FIG. 16, respectively with the columns $d, e$ and $f$; and FIGS. 13 and 17, respectively with the columns $e$ and $f$. In the embodiments of FIGS. 11—13 the perforated sheets are formed to angle-shape 4.

The guided passage of the sheets of FIGS. 18 through 21, through the cutting tool represented in FIG. 9, is the same as that described hereinabove with respect to FIGS. 10 through 13 except that the sheet is fed in the opposite direction. The hole perforations 2 of the sheet 1, are arranged in FIG. 18 in columns $a, b, c, d, h$ and $i$; in FIG. 19 in columns $b, c, d$ and $h$; in FIG. 20 in columns $b, c$ and $g$ and in FIG. 21 in columns $a, b, c, d$. The spacing between the holes in the longitudinal direction is TR. The corresponding shapes of the bent sheets are shown in FIGS. 22, 23 and 24 as the U-profile 3, and in FIG. 25 as the angle profile 4.

The cutting bushes are of identical size and are interchangeable with one another. In FIGS. 26—29 are illustrated bushes having work openings of different sizes and configurations. These cutting bushes are shown in FIGS. 30 through 33 respectively wherein 33 shows the bush with a small, central, round hole, 34 a bush with a large, central, round hole, 35 with a longitudinal slot and 36 with an eccentric circular hole.

I claim:

1. A method for producing profiled sheet metal sheets with perforated holes therein at a precise spacing and location, said method comprising perforating a flat sheet to form a plurality of holes which are spaced apart a distance less than that desired in the ultimate profiled sheet to be obtained from the sheet and deforming the sheet to produce said profiled sheet, the reduced spacing of the holes being such as to compensate for the elongation of the sheet when it is deformed whereby the hole spacing becomes increased to the desired in the profiled sheet, said sheet being advanced longitudinally, stepwise, through a zone in which the holes are punched, the reduced spacing being in the direction of feed of the sheet, said sheet being advanced in each step by a multiple of the reduced longitudinal spacing of the holes formed in the sheet.

2. A method as claimed in claim 1 wherein the reduction in the spacing of the holes in the sheet is varied in accordance with the thickness of the sheet.

3. Apparatus for producing profiled sheet metal sheets with perforated holes therein at a precise spacing and location, said apparatus comprising means for perforating a flat sheet to form a plurality of holes which are spaced apart a distance less than that desired in the ultimate profiled sheet to be obtained from the sheet, means for deforming the sheet to produce said profiled sheet, the reduced spacing of the holes being such as to compensate for the elongation of the sheet when it is deformed whereby the hole spacing becomes increased to that desired in the profiled sheet, means for advancing the sheet longitudinally, stepwise, through a zone in which the holes are punched, the reduced spacing being in the direction of feed of the sheet, said sheet being advanced in each step by a multiple of the reduced longitudinal spacing of the holes formed in the sheet, said means for perforating the sheet comprising a support and a plurality of punch members removably supported in said support.

4. Apparatus as claimed in claim 3 comprising means between said punch members for adjusting the spacing thereof in the longitudinal direction of feed of the sheet.

5. Apparatus as claimed in claim 3 comprising means for guidably feeding the advancing sheet.

6. Apparatus as claimed in claim 3 comprising a plate supporting a plurality of punch tools in a plurality of rows.

7. Apparatus as claimed in claim 3 comprising a plurality of plates each supporting a plurality of punch tools in a row, and means between said plates for adjusting the relative longitudinal positions thereof and thereby of the longitudinal spacing of the rows of punch tools.